Jan. 31, 1950
A. WARNICK ET AL
2,495,792
GENERATOR SEQUENCING CONTROL FOR PLURAL LOADS
Filed March 10, 1947
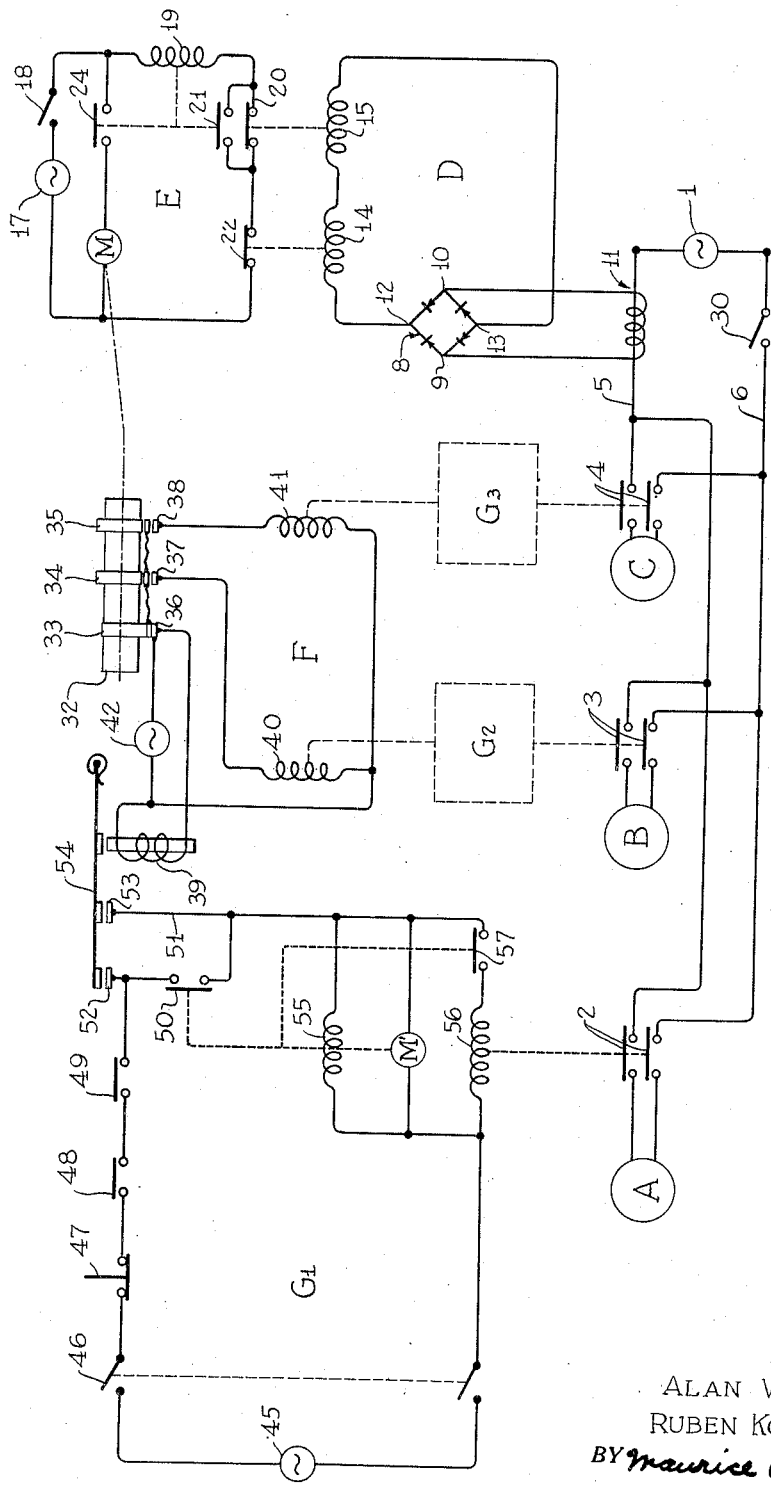
INVENTORS
ALAN WARNICK
RUBEN KOZARIAN
BY *Maurice A. Crews*
ATTORNEY Patented Jan. 31, 1950

2,495,792

UNITED STATES PATENT OFFICE 2,495,792

GENERATOR SEQUENCING CONTROL FOR PLURAL LOADS

Alan Warnick, Detroit, and Ruben Kozarian, Highland Park, Mich., assignors, by mesne assignments, to The Ohio Crankshaft Company, Cleveland, Ohio, a corporation of Ohio Application March 10, 1947, Serial No. 733,496

12 Claims. (Cl. 171—97)

This invention relates to apparatus for controlling the supply of power from a generator to a plurality of loads. More specifically, the invention pertains to apparatus for controlling the power supply from a generator in such manner that the various loads placed on the generator do not exceed the generator rating irrespective of the fact that the total permissible loads associated with the generator are actually in excess of the generator rating.

An object of the invention is to provide a sequencing device to be used in conjunction with generator output which will automatically connect the loads to the generator, where there is a group of individual loads, in such manner as to prevent a total load in excess of the generator rating.

Another object is to provide a method of load control which on separation of one or more loads of a group of loads from the generator to a point below the generator rating or capacity, additional loads are automatically supplied up to the full rating of the generator.

Still another object of the invention is to provide a control method for generators supplying a plurality of loads in which the condition of each load is periodically tested for connection to the generator, such connection being made only when the load condition is appropriate.

A further object of the invention is to provide a control method for sequencing a group of load connections to a generator at a relatively high or rapid rate.

An object also is to provide control means for a generator load system which will maintain the output of the generator supply at the highest effective value irrespective of variations in the number of load units adapted for connection to the generator.

Additional objects relate to means for preventing connection of load units to a generator which are not in readiness for supply of power; the elimination of complicated time control; and the establishment of a circuit arrangement in which the time schedule of load supply is not upset by failure of any one unit to be in readiness for receiving power at its appropriate point in the control sequence.

The figure in the drawing is a diagrammatic showing of the apparatus and circuit as applied to a bank of induction furnaces and illustrating the sequential operation of the mechanism.

Referring to the figure in detail, the letters A, B and C designate furnaces of the induction heating type which are adapted to receive power from the high-frequency generator 1 through a suitable switch means, such as the manual switch 30 and the double-pole contactor switches 2, 3 and 4 tapped off the main conductors 5 and 6 connected to the generator. It may be assumed that the full-load value of the furnaces A, B and C is in excess of the rated capacity of the generator 1, and consequently it is desirable that only a number of the furnaces having a total full-load value equal to or less than this rated capacity be connected at one time to the generator. To accomplish this result a device which may be referred to as a "sequencer" is employed. This sequencer comprises a series of branch circuits which may be referred to by the letters D, E, F and G, including, respectively, a power control, power means for the impulse device, an impulse device, and a timer to control when the heating cycle may be terminated.

The initial branch circuit D includes a metallic rectifier 8 with supply points 9 and 10 connected to a current transformer 11 electrically associated with the main conductor 5 of the generator 1. The output connections 12 and 13 of the rectifier are connected in series with relay coils 14 and 15. Coil 14 is designated the full-current relay and coil 15 the pick-up relay. The function of the full-current relay 14 is to actuate relay switch mechanism when the furnace load is equal to the rated capacity of the generator. The function of the pick-up relay 15 is to permit addition of new loads when the total load of the generator drops below a predetermined value related to the capacity requirements of any load.

In electrical association with the relays 14 and 15 is the second branch circuit E. This circuit includes a power source 17 of alternating current which is connected through a manual switch 18, to the relay coil 19, normally closed relay switch 20, normally open relay switch 21 in parallel with switch 20, and normally closed relay switch 22. Relay coil 19, parallel switches 20 and 21, and switch 22 are in series. Also in this branch circuit 16 and in parallel with the circuit including coil 19 and switches 20, 21 and 22 is the electric motor 23 and normally open relay switch 24.

Cooperation between branch circuits D and E results from the fact that relay switch 22 is operated by relay coil 14, this switch being open on energization of coil 14. Also, normally closed switch 20 is actuated by energization of relay 15 to open position. Additionally, switches 21 and 24, which are normally in open position, are moved to closed position by the energization of relay coil 19.

The operation of the sequencer as incorporated in branch circuits D and E may now be described. Assuming operation of the high-frequency generator 1 for power supply to the furnaces A, B and C, and assuming further that only two of the furnaces; that is, A and B, are connected for current reception from the generator, a certain amount of current is transformed and applied to branch circuit D of a quantity insufficient to actuate the relay switches 22 and 20. Switch 18 in branch circuit 16 being closed, relay coil 19 is energized to close switches 21 and 24. The closure of switch 21 locks in the circuit through coil 19 independently of the movement of switch 20. Closure of switch 24 energizes the motor M which thereupon drives the sequencing drum 32 to bring about successive actuation impulses to all of the various furnaces in sequence, as will be described in fuller detail hereinafter.

Should an additional furnace be added to the circuit, such as C, making the total load on the generator equal to its rated capacity, the current transformation supplying current to the relay 14 will bring about an opening of relay switch 22, thus breaking the circuit of source 17 through the relay 19 and deenergizing the sequencing motor M. By opening of switch 22 no additions to the load may be made through continued action of the sequencing drum. On limitation of the load in this manner the current in branch D reduces to the point where relay switch 22 closes, so that branch E may be conditioned for renewed operation provided switch 20 is also closed.

The functioning of relay 15 and switch 20 is such that the switch 20 opens at a lesser current value in the branch circuit D than is required to actuate relay 22. Since switch 20 is by-passed by switch 21, the opening of switch 20 prior to the opening of switch 22 does not affect the functioning of this branch circuit. However, when the full current switch 22 opens and relay 19 is deenergized, with the consequent opening of switch 21, the subsequent closure of switch 22 will not bring about renewed action of relay 19 unless switch 20 is closed. The constants of the relay switch and relay 15 are so chosen that switch 20 will remain open until the load on the generator has been reduced below its rated capacity. On a reduction of load to a predetermined point the so-called "pick-up" switch 20 will close and relay 19 will be actuated to close switch 24 and thus bring about again the movement of the sequencing drum by motor 23. This will bring about additions of furnace load units up to the full load capacity of relay 14, when switch 22 in branch circuit 16 will again open and the cycle will be repeated.

It appears from the description to this point that the function of the sequencer is to cause an electrical impulse to form in individual control circuits for each furnace unit, the effect of the impulse being to start the individual cycle for each load unit. Such an arrangement is illustrated in branch circuits F and G of the drawing. The impulse device F consists of a drum 32 provided with circumferential cams 33, 34 and 35, it being obvious that the number of cams corresponds to the number of units, which may be determined at will. These cams, as illustrated, are circumferentially spaced about the drum 32 so as to be effective at different points around the circumference of the drum. The drum is rotated at a substantially uniform speed by power connection to the motor 23 of the branch circuit 16.

Cams 33, 34 and 35 on the sequencing drum are adapted to bring about closure of circuit switches 36, 37 and 38, respectively. Each of these switches is included in a parallel circuit with a relay coil, the coils corresponding to the switches respectively being numbered 39, 40 and 41. A common source of power 42 supplies current through each of these switches to the corresponding relay coil.

The function of the relay coils 39, 40 and 41 is to close the timing circuit for each of the separate furnaces, and to this end there is a relay coil for each furnace. The timing circuit which is incorporated in the branch circuits G functions to close the power switches, as 2, 3 and 4, intermediate the high-frequency generator 1 and the individual furnace units. Since the various timing circuits are identical, details are disclosed only for one of them in the circuit connected to the sequencing relay coil 39 and designated as G1, the timing circuits for coils 40 and 41 being indicated by the boxes G2 and G3, respectively.

Describing the timing unit in detail, a power source 45 has connection through the manual switch unit 46, the manual stop button 47, the normally open load switch 48, the normally open interlock switch 49, and normally open control switch 50, to the motor M', and back to the generator source 45. In shunt with the control switch 50 is a circuit 51 including normally open contact switches 52 and 53. These switches are relay contacts fixed to an armature 54, which is electrically conductive between switches 52 and 53, and which is adapted to be operated by the relay coil 39 of the sequencing unit. On energization of the relay coil 39 both switches 52 and 53 are closed, thus forming a closed circuit around normally open control switch 50 in the branch G1.

In shunt with the motor M' is a coil 55 and a relay coil 56, the latter coil being in series with the normally open relay switch 57. The function of coil 55 in part is to close relay switches 50 and 57 on energization. This coil also is associated with the motor M', the latter being the timing motor of the circuit, and serves to close the clutch of the motor to the timing mechanism. The function of relay coil 56 is to bring about closure of the contactor main switch 2 and the power supply to the furnace A. Other known means may be employed to determine when the heating cycle may be terminated, such as temperature sensitive, power sensitive or a manual operation may be provided.

In operation the branch circuit G1 functions as follows to bring about operation of the furnace A. It may be assumed that the load switch 48 is closed through placement of the workpiece in the furnace, and the interlock switches, which depend upon the appropriate operating conditions in the furnace, such as water pressure, closure of doors, appropriate coolant movement, and the like, are also closed. Under these conditions when the sequencing switch 36 is closed an impulse is transmitted to the relay coil 39, drawing down the armature 54 and closing switches 52 and 53. Thereupon relay coil 55 is energized, engaging the clutch between motor M' and the timing mechanism and closing relay switches 50 and 57. Simultaneously, the timing motor M' is set in motion, and with the closure of switch 50 the motor circuit is locked in independently of action of the sequencing switches 52 and 53. Closure of switch 57 also causes energization of relay coil 56 and closure of contactor 2. This condition of power application to the furnace and circuit arrangement of branch G is maintained for the predetermined timing period of the timer controlled by motor M'. At the conclusion of this period relay coil 55 is deenergized, thereupon permitting the opening of the motor clutch, the opening of relay switch 57, and the consequent opening of main contactor switch 2. Also, control switch 50 opens and the circuit to the timer is broken (the sequencing switch 36 having opened prior to this time). The timer then resets in preparation for a new sequencing impulse when conditions, as indicated by closure of switches 48 and 49, are appropriate.

It is apparent from the above description that by reason of the circumferential displacement of the cams 33, 34 and 35 impulses are transmitted to the timing branches G1, G2 and G3 spaced as to time so that the various loads are brought onto the high-frequency generator 1 at successive time intervals. It is also apparent that at the time of a sequencing impulse, should the individual furnace, as A, B, or C, be not in readiness for heating operation, it will not be energized. However, due to the continued rotation of the sequencing drum 32, the impulse will be applied at consecutive time intervals subsequently.

Having described the function of the various branch units of the sequencer, it may be here appropriate to outline broadly the complete operation of the unit. Assuming switches 2, 3 and 4 in the main power circuit open and generator 1 energized, switch 18 of branch circuit E is closed, thereby starting the sequencer motor 23 and bringing about rotation of the sequencing drum 32. Thereupon starting impulses are applied consecutively and repeatedly to the group of furnaces A, B and C. If none of these furnaces are in condition for operation, the effect of the closing of switch 18 will be negative. Should, however, any one of them be ready for operation, the sequencing impulse will originate a heating cycle in the appropriate timer circuit of this furnace. Should the number of furnaces be equal to the capacity of the generator 1, the overload relay switch 22 will open and the sequencing drum will cease rotation, thereby preventing addition of new furnace units to the total load. As the group of furnaces diminishes in number through the expiration of the timing mechanism in each furnace circuit, a point will be reached in the current delivered by the high-frequency generator 1 to the branch circuit 7 at which the pick-up relay will function to close the switch 20 and permit reenergization of the sequencing motor 23. Thus new load units may be added and the total load built up to the full capacity of the generator 1.

In order to set out the circuit and arrangement with adequate clearness, the same has been described in connection with induction furnaces. However, it is evident that the circuit has application to any type load wherein a bank of units is associated with a power supply subject to overload when all of the units are connected. Accordingly no limitation is intended by the illustrative arrangement as described. Also, it is pointed out that the sequencing unit is described in simplified form and with three units so as to reduce the complexity of the description. The sequencing device shown in the copending application of Harold A. Strickland, Jr., on "Power unit sequence control," Serial No. 589,053, may be used alternatively as a practical sequencing device. Modifications other than those mentioned may be made, the invention being comprehended within the claims hereto appended.

What is claimed is:

1. A load control for electric power generators adapted to supply intermittent power to a plurality of electrical loads through suitable means including electric switches, the generator having a predeterminable full capacity rating, a unit for each load for determining a period of power supply to the associated load and actuatable by an impulse, plural impulse means for initiating action of each of said units, apparatus for establishing a consecutive series of unit actuating impulses, and means associated with said apparatus for interrupting the operation of said apparatus when power supplied by the generator approaches the generator capacity rating.

2. A load control for electric power generators adapted to supply intermittent power to a plurality of electrical loads through suitable means including electric switches, the generator having a predeterminable full capacity rating, a unit for each load for determining a period of power supply to the associated load and actuatable by an impulse, plural impulse means for initiating action of each of said units, apparatus for establishing a consecutive series of unit-actuating impulses, equipment responsive to the generator loading for deenergizing said impulse means when power supplied by the generator equals a predetermined loading and for reenergizing said impulse means on reduction of generator loading below said predetermined loading.

3. A load control for electric power generators adapted to supply intermittent power to a plurality of electrical loads through suitable means including electric switches, the generator having a predeterminable full capacity rating, control means for each load for determining a period of power supplied to the associated load, a sequencing device for transmitting an energy impulse successively to each of said control means to initiate load supply to said associated load, a motor for operating said sequencing device, a relay connected to said generator and operative to stop said motor on increase of power supplied from the generator beyond a predetermined value.

4. A load control for electric power generators adapted to supply intermittent power to a plurality of electrical loads through suitable means including electric switches, the generator having a predeterminable full capacity rating, a timer unit for each load for timing a period of power supplied to the associated load, a sequencing device for transmitting an energy impulse successively to each of said load timers to initiate load supply thereto, a motor for operating said sequencing device, a relay connected to said generator and operative to stop said motor on increase of power supply from the generator above a predetermined value, and means for starting said motor to bring about repetition of the sequencing power cycle in the various loads when the generator load drops below the capacity rating thereof.

5. A load control for electric power generators adapted to supply intermittent power to a plurality of electrical loads through suitable means including electric switches, the generator having a predeterminable full capacity rating, a timer unit for each load for timing a period of power supplied to the associated load, a sequencing device for transmitting an energy impulse successively to each of said load timers to initiate load supply thereto, a motor for operating said sequencing device, a first relay connected to said generator and operative to stop said motor on increase of power supply from the generator above a predetermined value, and a second relay electrically connected to said generator operative to start said motor when the generator load current drops below the capacity rating thereof, the operating current point of said second relay being substantially below that of the first relay.

6. A load control for an electric power source supplying intermittent power to one or more of a plurality of individual electric load circuits through suitable electric switch means or the equivalent, said control comprising in combination a controller for each switch means including a timing unit for determining the length of time each load circuit is connected to the source, and power-sensitive apparatus operatively associated with the load power on the source for rendering said controllers ineffective for actuating further switch means when the power supplied to already connected load circuits is equal to or in excess of a predetermined value.

7. A load control for electric power generators supplying intermittent power to one or more of a plurality of individual electric load circuits through suitable electric switches or the equivalent, said control comprising in combination a controller for each switch, means including means for determining the period of supplying power to an individual load circuit, initiating mechanism for periodically actuating each controller and power-sensitive apparatus operatively associated with the load on said source for rendering said initiating mechanism inoperative when the load on said source equals or exceeds a predetermined value.

8. A load control for an electric power source supplying intermittent power to one or more of a plurality of individual electric loads through suitable electric switches or the equivalent, said control comprising: a timer for determining the length of time power is supplied to each individual load, an apparatus associated with said switches for preventing connection of additional loads when a predetermined number of loads are connected by said switches to the source and the load approaches a predetermined maximum value.

9. In an electric power circuit including; an electrical power source, a plurality of electrical load circuits, and means for each load circuit for independently connecting same to said power source, said power source having a predeterminable full-capacity rating, the improvement which comprises: timing means for determining the length of time each of said loads is connected through said means to said power source, a load control including power-sensitive apparatus operatively associated with the power source and sensitive to the load thereon, said apparatus including apparatus operatively associated with each load circuit for preventing the connection of additional loads to said power source when the power delivered to the load circuits already connected equals or exceeds a predetermined value.

10. In an electric power circuit including; an electrical power source, a plurality of electrical load circuits, and connecting means for each load circuit for independently connecting same to said power source, said power source having a predeterminable full-capacity rating, the improvement which comprises: timing means for determining the length of time each of said connecting means connects a load circuit to said power source, a load control including a controller for each connecting means, and power-sensitive apparatus operatively associated with the power supplied by said power source for rendering said controllers inoperative to actuate additional connecting means when the power demand on said power source equals or is in excess of a predetermined value.

11. In an electric power circuit including; an electrical power source and a plurality of electrical load circuits and connecting means for each load circuit for independently connecting same to said power source, said power source having a predeterminable full-capacity rating, the improvement which comprises: a load control including a controller for each connecting means, initiating mechanism for periodically actuating each controller, and apparatus for rendering control of said connecting means by said controllers inoperative even though the controllers are periodically actuated by said initiating mechanism when a predetermined number of loads are electrically connected to the power source and the load approaches a predetermined maximum value.

12. A method of controlling the power demand on an electrical power source by a plurality of electrical loads adapted to be intermittently energized comprising the steps of: providing a series of load-connecting impulses to connect one or more loads to the power source until the total load on the power source reaches a predetermined value, disconnecting each load from said power source after a predetermined time interval, stopping said impulses until the predetermined time interval has disconnected sufficient of the individual loads that the total load on the power source is reduced to a point where the addition of additional loads will not exceed the predetermined value, restarting said impulses to add additional loads to increase the total load on the power source to said predetermined value whereby to continuously maintain the load on the power source at or near a predetermined maximum value.

ALAN WARNICK.
RUBEN KOZARIAN.

REFERENCES CITED

The following references are of record in the file of this patent:

UNITED STATES PATENTS

| Number | Name | Date |
|---|---|---|
| 1,183,196 | Heany | May 16, 1916 |
| 1,894,838 | Weaver | Jan. 17, 1933 |
| 2,011,396 | Cogswell | Aug. 13, 1935 |
| 2,210,710 | Diamond et al. | Aug. 6, 1940 |
| 2,315,958 | Hill et al. | Apr. 6, 1943 |